United States Patent [19]
Coles
[11] 3,907,434
[45] Sept. 23, 1975

[54] BINAURAL SIGHT SYSTEM

[75] Inventor: Donald K. Coles, Fort Wayne, Ind.
[73] Assignee: Zipcor, Inc., Fort Wayne, Ind.

[22] Filed: Aug. 30, 1974
[21] Appl. No.: 502,033

[52] U.S. Cl. .................... 356/152; 356/4; 340/407; 250/222 R; 178/DIG. 32; 35/35 A
[51] Int. Cl.[2] .................. G01B 11/26; G01D 21/04
[58] Field of Search .................. 356/141, 152, 4, 5; 340/407; 250/222 R; 178/DIG. 32; 35/35 A

[56] References Cited

UNITED STATES PATENTS

| | | | |
|---|---|---|---|
| 3,369,228 | 2/1968 | Foster | 178/DIG. 32 |
| 3,543,666 | 12/1970 | Kazel | 356/4 |
| 3,654,477 | 4/1972 | Benjamin, Jr. | 356/5 |

*Primary Examiner*—Maynard R. Wilbur
*Assistant Examiner*—S. C. Buczinski

[57] ABSTRACT

The invention relates to a sight system for producing binaural sound representative of the location of a visible object with respect to a listener. It includes means for generating first and second time related signals at an audible frequency. A headset including two independently operable earphones which are connected to the signal generating means for reproducing sound in each of the earphones in response to each of the first and second signals, respectively. The signal-generating means includes two electronic camera devices that generate image signals representative of optical images projected thereonto. The two camera devices are positioned in horizontally spaced relation to have overlapping fields of view. Circuitry of the signal generating means independently connects the right and left camera devices to the right and left earphones, respectively. The camera devices are scanned in opposite directions over the respective fields of view, the right-hand camera device from right to left and the left-hand camera device from left to right. Audible signals are reproduced in the earphones representative of the locations of objects in the overlapping fields of view.

12 Claims, 10 Drawing Figures

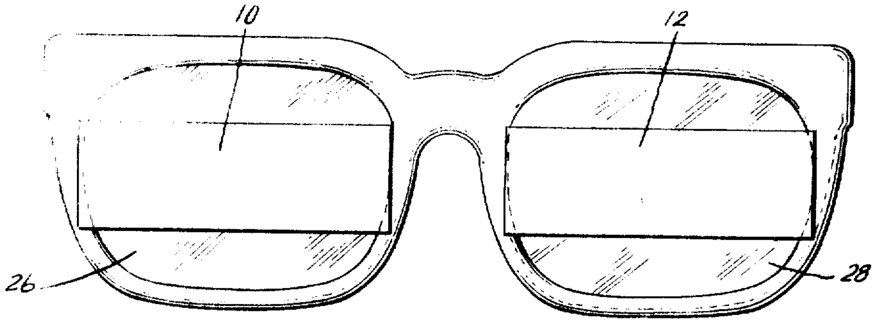
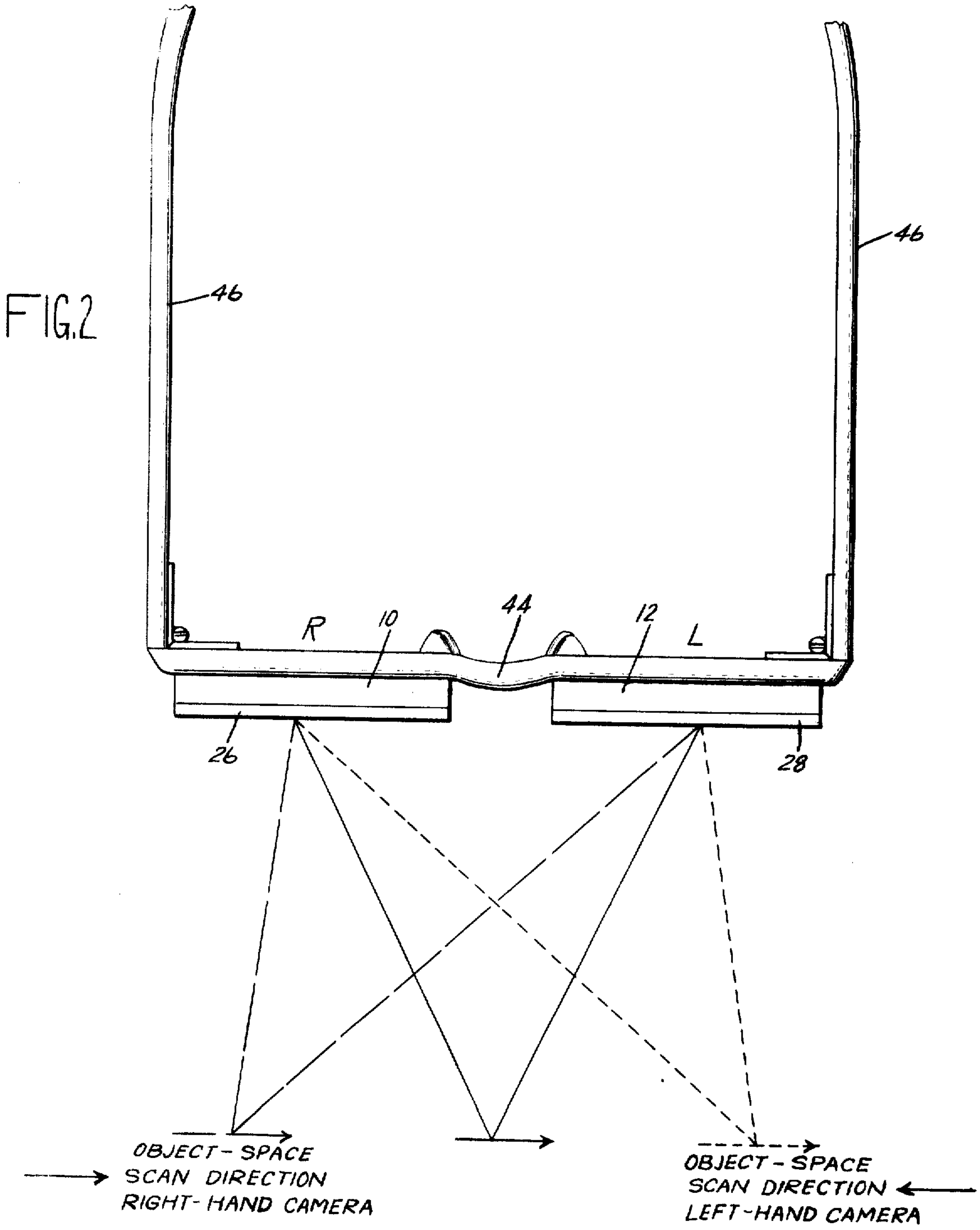
FIG.2

| SCAN RATE | $R_1$ | $R_1$ | $R_1$ | $C_1$ | $R_1$ |
|---|---|---|---|---|---|
| 100 KC | 50K | 50K | 1K | 1.0 | 10K |
| 1MC | 20 | 20 | 1 | .1 | 3K |
| 10MC | 6.2K | 6.2K | 1K | .01 | 500 |

BINAURAL SIGHT SYSTEM

BACKGROUND OF THE INVENTION

1. Field of the Invention

This invention relates generally to sight systems for the blind and more particularly to a sight system that utilizes the sense of hearing or cuteaneous stimulation perceiving objects in a given optical field.

2. Description of the Prior Art

It is known that optical information may be transmitted to the brain by a pathway other than the eye, for example a television picture system being utilized as the optical sensor to drive a tactile transducer placed against the skin. It is also known that the sense of hearing is directionally sensitive, such that the sound of the snap of the fingers can be localized as to the direction from which it emanates. It has been determined that the time difference with which the two ears are stimulated determines the direction from which a person hears the sound coming. If both ears are stimulated simultaneously and there is no time difference, the sound is heard as being dead ahead.

SUMMARY OF THE INVENTION

In accordance with the broader aspects of this invention, there is provided a sight system for producing binaural sound representative of the location of a visible object which includes means for generating first and second time related signals and two earphones of a head set connected to the signal generating means for reproducing the sound in each in response to the first and second signals, respectively. The signal-generating means includes two electronic camera devices that generate image signals representative of optical images projected thereonto. Means are provided for positioning the camera devices in horizontally spaced relation to have overlapping fields of view. The earphones are also held in horizontally spaced relation by means of a suitable headband or the like, and signal circuitry independently connects the right and left camera devices to the right and left earphones, respectively. Means are provided for scanning the camera devices in opposite directions over the respective fields of view, the right-hand camera device scanning from right to left and the left-hand camera device from left to right.

It is an object of this invention to provide a sight system for producing signals such as binaural sound or tactile stimulation representative of the location of a visible object with respect to a subject individual. It is also an object to provide a method of converting optical information into binaural sound for the purpose of developing a sound image which may be interpreted by the listener as representative of the optical information.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a front view of the camera portion of one embodiment of this invention which resembles spectacles;

FIG. 2 is a top view thereof;

DESCRIPTION OF THE PREFERRED EMBODIMENT

Figures 3, 4, 5:
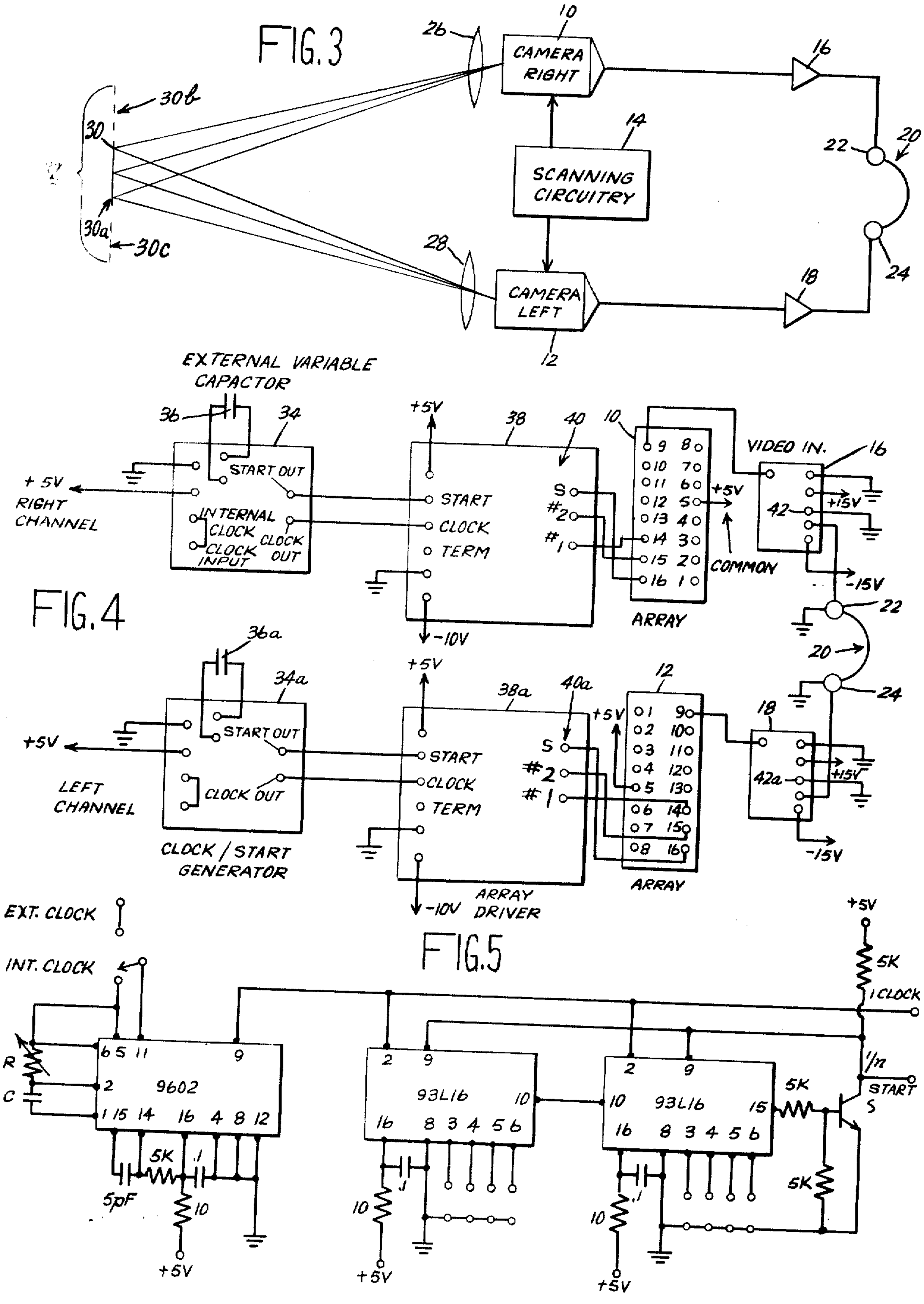
FIG. 3 is a block diagram of the circuitry of this invention.
FIG. 4 is a wiring diagram thereof.
FIG. 5 is a schematic of the clock/start generator shown as one of the blocks in FIG. 4.
Figure 6:
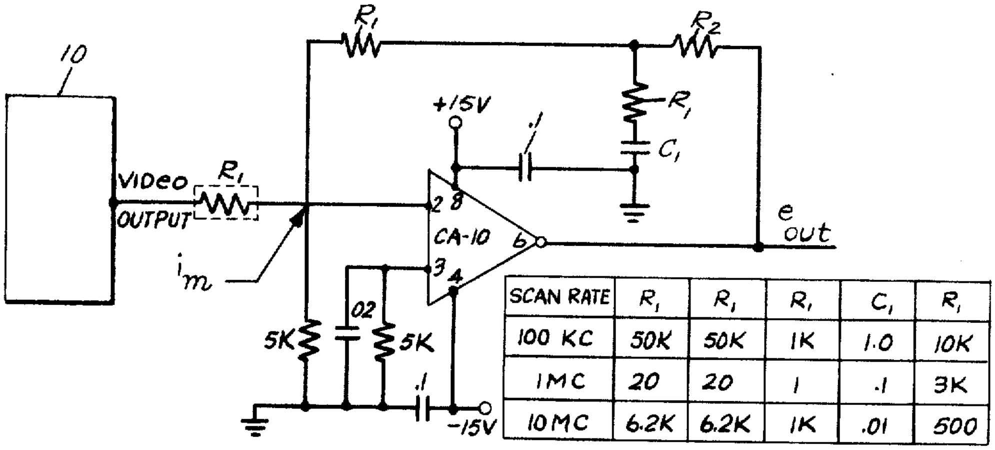
FIG. 6 is a schematic of the operational amplifier portion of the system of FIG. 4.
Figure 7:
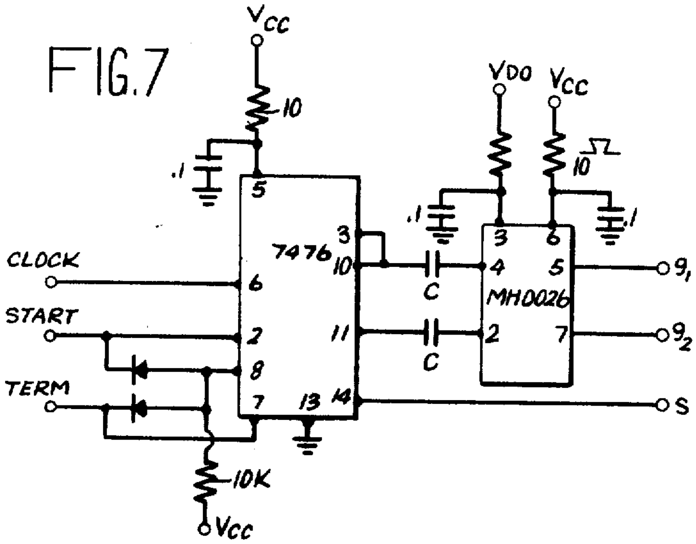
FIG. 7 is another schematic of the driver portion of the system of FIG. 4.

Referring to the drawings, a binaural sight system capable of converting optical information into sound images is shown. Referring to FIGS. 1, 2 and 3, identical camera devices 10 and 12 which may include any of the well known television camera tubes or devices, such as vidicons, image orthicons, solid-state line scanners and the like have suitable scanning circuitry 14 connected thereto and amplifiers 16 and 18 to the output circuits thereof, respectively. A stereophonic headset 20 has the earphones 22 and 24 thereof connected to the output circuits of the amplifiers 16 and 18.

Suitable lenses 26 and 28 are positioned in front of the photo-sensitive electrodes of the camera devices 10 and 12, respectively, and are so arranged as to have overlapping fields of view so as to view simultaneously for example, a centrally positioned object 30 in front of the camera devices 10 and 12. The scanning circuitry 14 in conjunction with the camera devices 10 and 12 are so arranged as to scan an object space contained between the extremities of the bracket 32 in opposite directions, the right-hand camera 10 scanning from right to left and the left-hand camera scanning from left to right. The scanning of the two camera devices 10 and 12 is synchronized such that each scan begins and ends at the limits of the object space 32.

By scanning the object space 32 at a suitable rate, for example from 10 to 2,000 scans per second, video signals appearing in the output circuits of the two camera devices 10 and 12 and suitably amplified by the amplifiers 16 and 18 can be heard in the two earphones 22 and 24 as tones or clicks depending upon the type of camera devices 10 and 12 used. Assuming, however, that the camera devices 10 and 12 see a black object 30 on a white background in the object space 32, a signal, in one embodiment of this invention, will be produced in the earphones 22 and 24 corresponding to a click. Since the object 30 is centrally positioned between the camera devices 10 and 12 as shown, the signals in the earphones 22 and 24 will occur simultaneously. This will indicate to the listener that the object 30 being viewed is in the center of the object space 32.

If the object 30 is displaced toward the right side as indicated by the numeral 30*b*, scanning by the two camera devices 10 and 12 will result in the camera device 10 seeing the object 30*b* before the camera device 12. This results from the fact that since both camera devices 10 and 12 scan from the opposite extremities of the object space 32 inwardly in synchronism, the camera device 10 will immediately see the object 30*b* at the start of its scan whereas the camera device 12 will see the object 30*b* at the end of its scan. Depending upon the time delay for the camera device 12 to see the object 30*b* following sight by the camera device 10, signals will be produced in the earphones 22 and 24 with a corresponding time delay. Thus the right-hand earphone 22 will be energized ahead in time of the left-hand earphone 24. The listener detects this time delay in the sound in the two earphones and uses this to perceive that the optical image is at the location of the object 30*b*. If the object 30 is displaced at the opposite extremity 30*c* of the object space 32, then the audio signal will be produced in the earphone 24 ahead of that in the earphone 22, indicating to the listener that the object is at the left extremity.

Figure 8:
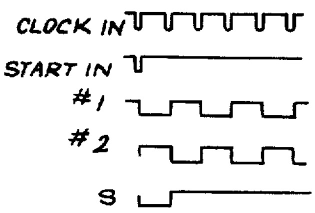
FIG. 8 illustrates representative wave forms at the input and output circuits of the circuitry of FIG. 7.

Referring to FIG. 4, an operative embodiment of the system of FIG. 3 is shown. In this embodiment, integrated and printed circuits are used. The circuitry is divided into two, identical channels such that a description of one will suffice for both. Referring to the right-hand channel, a clock/start generator 34 of conventional construction provides output pulses as shown in the upper portion of FIG. 8 and start pulses is also shown in FIG. 8. Generator 34 may have connected thereto a variable capacitor 36 for controlling the repetition rate of the clock pulses. In use, the rates of the two generators 34 and 34*a* are synchronized by the user.

To the output circuit of the generator 34 is connected an array driver 38 of conventional design having output terminals 40 at which appear the start and output wave forms shown in FIG. 8 which are identified by the same symbols as those of the output terminals 40 where they appear. The driver 38 is designed to provide optimum drive requirements for self-scanning photodiode arrays such as the solid-state line scanner RL-128A as marketed by Reticon Corporation of Mountain View, Calif. As the wave forms of FIG. 8 reveal, the clock pulses from the generator 34 are formed into the square wave pulses of the trains No. 1 and No. 2 while the start pulse from the generator 34 is formed into the single, square wave pulse indicated by the letter "S."

The camera device 10 in this embodiment is a solid-state line scanner, RL-128A, as identified above, which contains 128 photodiode pairs spaced on 2 mil centers. The array of diodes is scanned with each diode being sequentially accessed and charged through a common video line to standard voltage. During the scan period, the diodes are discharged by the photo current generated by incident light. The charge required to restore each diode in sequence to the standard voltage is the video output signal.

The line scanner 10 also includes a dynamic shift counter integrated onto the same silicon chip as the photodiodes. The shift counter is driven by the complementary square waves No. 1 and No. 2 shown in FIG. 8. Each pulse or wave of the two wave trains No. 1 and No. 2 key each switch portion of the shift register connected to a respective one of the 128 photodiodes such that a full complement of the pulses of the two wave trains No. 1 and No. 2 between the start pulses results in activating in sequence all of the 128 photodiodes. This constitutes one scan cycle of the camera device, there being one scan cycle for each start pulse of FIG. 8.

The video output terminal of the scanner 10 is connected to the input terminal of the operational amplifier 16. An earphone 22 is connected to the output terminal 42 as shown. Voltages and terminal connections are made as shown in the drawing.

The left-hand channel is identically configured as just described, like parts being denoted by like numerals with the suffix "a," with the exception that the scanner 12 is rotated 180° in position with respect to the scanner 10 in order to obtain the opposite scanning function described earlier. The output terminal 42*a* of the amplifier 18 is connected to the earphone 24.

The components used in the circuit of FIG. 4 for one operative embodiment of this invention are given in the following; however, it is to be understood that other circuit configurations may be used without departing from the spirit and scope of this invention.

| | |
|---|---|
| Clock/start generator 34, 34a | RC—1, Reticon Corporation Mountainview, California |
| Array driver 38, 38a | RD—2, Reticon Corporation Mountainview, California |
| Scanner 10, 12 | RL—128A, Reticon Corporation Mountainview, California |
| Amplifier 16, 18 | CA—10 |

In operation, it may be assumed that the outputs of the clock generator 34, 34*a* and the array drivers 40, 40*a* are such as to scan each of the scanners 10 and 12 at an audible rate or at a rate falling within the range of 10 to 2,000 scans per second. The two scanners 10 and 12 are oppositely oriented so that the scans of the object space 32 (FIG. 3) will be in opposite directions. This scanning is shown more clearly in FIG. 9 wherein the scanner 10 is shown as scanning the object space 32 from right to left and the scanner 12 from left to right.

Figures 9, 10:
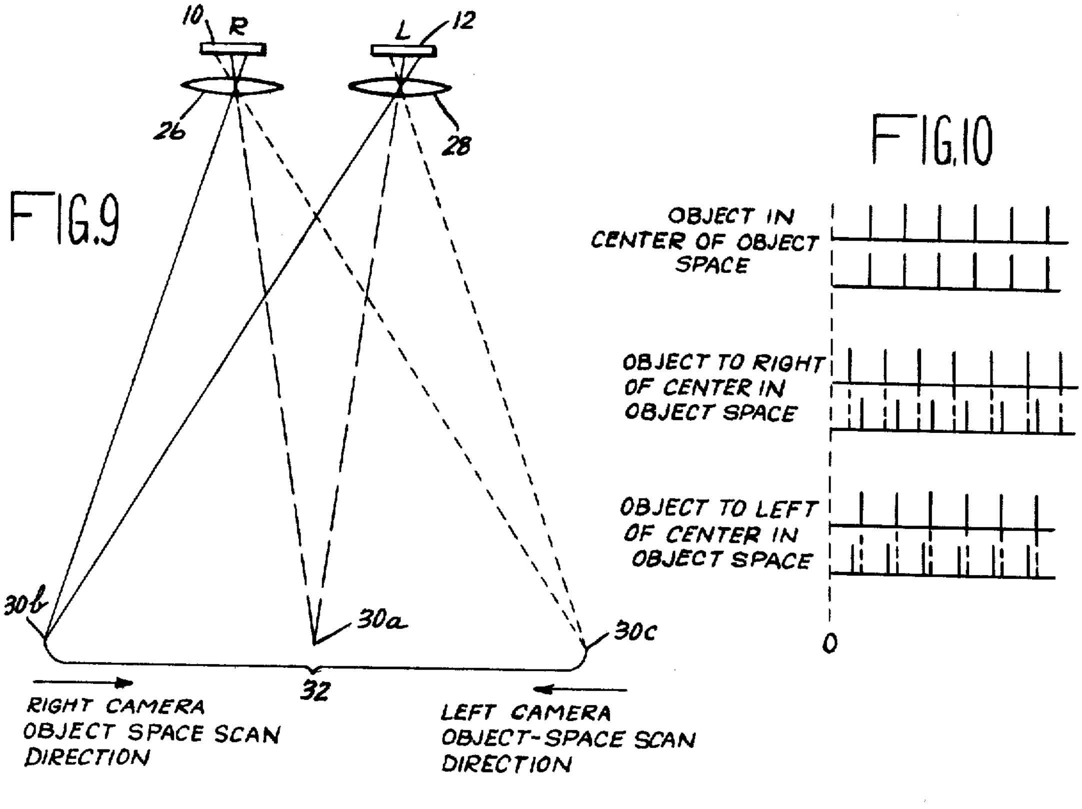
FIG. 9 is a diagrammatic illustration of the camera portion used in explaining the operation of this invention.
FIG. 10 is an illustration of representative signals applied to the earphones of the system shown in FIGS. 3 and 4.

Typical signals fed to the earphones 22 and 24 are shown in FIG. 10 for an object viewed straight ahead, to the right side, and the left side, the object being one high contrast vertical bar for six scans. In FIG. 10*a*, the output pulses from the amplifier are shown to be identical and in synchronism. The pulses occur at an audible rate such that clicks are heard in the two earphones simultaneously. This indicates to the listener that the object viewed is straight ahead.

In FIG. 10*b*, the signal appearing in the left earphone is shown delayed slightly with respect to that being produced in the right earphone. This indicates to the listener that the object is to his right side. FIG. 10*c* indicates that the object viewed is to the left side, the signal applied to the earphone 24 occurring sightly ahead of the corresponding signal applied to the right earphone. With practice, the listener can determine the degree to which the object is to the right or left of center.

The clock generators 34 and 34*a* produce pulses that are in synchronism. If necessary, an external clock may be connected to both the generators 34 and 34*a* for maintaining the outputs thereof synchronized.

FIGS. 1 and 2 illustrate one type of mounting for the scanners 10 and 12 and the respective lenses 26 and 28. The scanners 10 and 12 are mounted on a spectacle frame in the positions normally occupied by the lenses in reverse, horizontal scanning order. The spectacle frame includes the usual nose piece 44 and bows 46 so that an individual may wear the frame and position the scanners 10 and 12 in the same manner as soectacle lenses.

A blind peson having the spectacles-type frame and earphones in place can learn to "see" by hearing the sounds in the earphones representative of light and dark objects scanned by the scanners 10 and 12. With training, the blind person can discern a light-emitting doorway or window as well as contrasting outlines of other objects. Thus, a blind person essentially can learn to "see" by the use of his sense of hearing.

As explained previously, the camera devices 10 and 12 may include electronic pickup tubes or devices other than the ones shown in FIG. 4. Vidicon television camera tubes may, for example, be used in conjunction with the usual lenses, the scanning circuitry connected thereto being limited to a horizontal scan of a single line, the repetition rate of the scanning being in the range as mentioned hereinabove. The output signals from the vidicons are amplified, if necessary, and applied to an earphone set 20 as already described.

It is possible to use a single camera device in combination with suitable circuitry, scanning alternately right to left and left to right for generating the signals. Also, the earphones 22 and 24 may be replaced by other known stimulating devices, such as mechanical vibrators and electrical impulse generators and the like.

While there have been described above the principles of this invention in connection with specific apparatus, it is to be clearly understood that this description is made only by way of example and not as a limitation to the scope of the invention.

What is claimed is:

1. A sight system for producing signals representative of the location of a visible object comprising means for generating first and second time related signals at an audible frequency, two electrically operable stimulating devices connected to said signal-generating means for activating each of said devices in response to said first and second signals, respectively; said signal-generating means including two electronic camera devices that generate image signals representative of optical images projected thereonto, means positioning said camera devices in horizontally spaced relation to have overlapping fields of view, said stimulating devices also being held in horizontally spaced relation, signal circuitry independently connecting the right and left camera devices to the right and left stimulating devices, respectively, and means for synchronously scanning said camera devices in opposite directions over the respective fields of view, the right-hand camera devices scanning from right to left and the left-hand camera device from left to right.

2. The system of claim 1 including a frame having said camera devices mounted thereon, and said stimulating devices being in the form of earphones carried by a head band.

3. The system of claim 2 in which said camera devices are positioned such that said overlapping fields extend over an optical space disposed within an angle having its apex in the region between said camera devices.

4. The system of claim 3 in which said frame has a nose-piece and bows for positioning on the face of a wearer with said camera devices being positioned thereon in the locations corresponding to lenses in spectacles.

5. The system of claim 3 in which each camera device includes an image lens and a light sensitive electrode disposed to receive the optical image therefrom, said scanning means including circuitry which electrically scans said light-sensitive electrode at a rate in the range of about ten to two thousand times a second.

6. The system of claim 5 in which said light-sensitive electrode includes a solid-state device having a horizontally arranged array of interconnected photo-diodes, said scanning circuitry including a clock and shift register which is actuated in sequence by clock pulses, the individual stages of the shift register being connected to the array of photo-diodes in sequence thereby to switch the latter in response to sequential actuation of said stages.

7. The system of claim 6 in which the signal circuitry for each camera and aural device includes an electrical connection between said photo-diodes and the respective ear phone whereby signals produced by the change in photo-conductivity of said photo-diodes are conducted thereto.

8. The system of claim 7 in which said electrical connection of said signal circuitry includes an operational amplifier for amplifying the signals produced by said photo-diodes.

9. The method of producing binaural sound representative of light objects in a predetermined field of view comprising the steps of:

a. viewing an object space by two horizontally spaced camera devices that generate time related signals respectively of the visible objects in said space, b. synchronously scanning said camera devices over said object space in opposite horizontal directions, the right-hand device from right to left and the left-hand device from left to right, c. generating electrical signals at an audible rate representative of the location and character of the objects viewed by said camera devices, and d. reproducing the audible signals in two horizontally spaced aural devices, respectively, the signals from the right-hand camera device being reproduced by the right-hand aural device and the left-hand camera device being reproduced by the left-hand aural device.

10. The method of claim 9 in which the scanning of each camera device is at a rate within the range of about ten to two thousand cycles per second.

11. The method of claim 10 in which the object space is disposed in front of said camera devices and is included within an angle having its apex located in the region between said camera devices.

12. The method of claim 11 in which said signals associated with said two camera devices are independently generated thereby and separately conducted to said aural devices, respectively.

* * * * *